(12) United States Patent
Simmons

(10) Patent No.: US 11,589,516 B2
(45) Date of Patent: Feb. 28, 2023

(54) AGRICULTURAL BALER WITH CONTROLLED WRAPPING MATERIAL BRAKE

(71) Applicant: CNH Industrial America LLC, New Holland, PA (US)

(72) Inventor: Scott C. Simmons, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 736 days.

(21) Appl. No.: 16/547,171

(22) Filed: Aug. 21, 2019

(65) Prior Publication Data

US 2021/0051855 A1 Feb. 25, 2021

(51) Int. Cl.
*A01F 15/07* (2006.01)
*A01F 15/08* (2006.01)
*A01F 15/14* (2006.01)

(52) U.S. Cl.
CPC ...... *A01F 15/0715* (2013.01); *A01F 15/0858* (2013.01); *A01F 15/141* (2013.01); *A01F 2015/072* (2013.01); *A01F 2015/0725* (2013.01)

(58) Field of Classification Search
CPC .............. A01F 15/0715; A01F 15/0858; A01F 15/141; A01F 2015/072; A01F 2015/0725; A01F 2015/076
See application file for complete search history.

(56) References Cited

U.S. PATENT DOCUMENTS

| | | |
|---|---|---|
| 5,581,976 A | 12/1996 | Underhill |
| 6,295,797 B1 | 10/2001 | Naaktgeboren et al. |
| 6,644,006 B1 | 11/2003 | Merritt et al. |
| 6,877,304 B1 | 4/2005 | Smith et al. |
| 6,888,092 B2 | 5/2005 | Walters |
| 7,908,822 B2 * | 3/2011 | McClure ............. A01F 15/0715 53/64 |
| 8,490,366 B1 | 7/2013 | Hintz |
| 9,376,227 B2 * | 6/2016 | Smith ..................... B65B 13/04 |
| 9,706,716 B2 * | 7/2017 | Smith ................ A01F 15/0715 |
| 9,926,090 B2 | 3/2018 | Ravaglia |
| 10,827,685 B2 * | 11/2020 | Talsma ................ A01F 15/0715 |
| 2012/0240527 A1 * | 9/2012 | Herron ................ A01F 15/0715 53/64 |

(Continued)

FOREIGN PATENT DOCUMENTS

EP  3 199 015 A1  8/2017

*Primary Examiner* — Andrew M Tecco

(74) *Attorney, Agent, or Firm* — Peter Zacharias; Patrick Sheldrake

(57) ABSTRACT

A wrapping assembly includes: a material roll that holds a roll of wrapping material; a duckbill assembly including a duckbill carrying a duckbill roll that draws material from a roll of wrapping material held by the material roll, the duckbill being movable between a first position and a second position; a duckbill actuator coupled to the duckbill that moves the duckbill between the first position and the second position; a variable brake associated with the material roll that applies a variable braking force to the material roll; and a controller operatively coupled to the duckbill actuator and the brake. The controller determines that a load on the duckbill actuator exceeds a threshold value and outputs a brake reduction signal to the brake so the brake reduces applied braking force to the material roll when the load on the duckbill actuator exceeds the threshold value.

15 Claims, 7 Drawing Sheets

(56) References Cited

U.S. PATENT DOCUMENTS

| | | | |
|---|---|---|---|
| 2014/0053510 A1* | 2/2014 | Smith | A01F 15/0715 |
| | | | 53/461 |
| 2016/0183474 A1* | 6/2016 | Thoreson | B65B 57/04 |
| | | | 53/399 |
| 2017/0049058 A1 | 2/2017 | Eubanks et al. | |
| 2017/0273247 A1* | 9/2017 | Smith | A01F 15/0715 |

* cited by examiner

AGRICULTURAL BALER WITH CONTROLLED WRAPPING MATERIAL BRAKE

FIELD OF THE INVENTION

The present invention pertains to agricultural vehicles and, more specifically, to agricultural balers.

BACKGROUND OF THE INVENTION

For many years harvesters, such as agricultural balers, have been used to consolidate and package crop material to facilitate the storage and handling of the crop material for later use. Usually, a mower-conditioner cuts and conditions the crop material for windrow drying in the sun. When the cut crop material is properly dried, a harvester, such as a round baler, travels along the windrows to pick up the crop material and form it into cylindrically-shaped round bales.

More specifically, pickups of the baler gather the cut and windrowed crop material from the ground, then convey the cut crop material into a bale-forming chamber within the baler. A drive mechanism operates to activate the pickups, augers, and a rotor of the feed mechanism. A conventional baling chamber may include a pair of opposing sidewalls with a series of belts that rotate and compress the crop material into a cylindrical shape.

When the bale has reached a desired size and density, a wrapping system may wrap the bale to ensure that the bale maintains its shape and density. For example, a net may be used to wrap the bale of crop material. A cutting or severing mechanism may be used to cut the net once the bale has been wrapped. The wrapped bale may be ejected from the baler and onto the ground by, for example, raising a tailgate of the baler. The tailgate is then closed and the cycle repeated as necessary and desired to manage the field of cut crop material.

To wrap the bale, the wrapping system executes a net wrapping cycle during which an actuator powers a rotating arm, also referred to as a duckbill, to move from a home position to an insert position to guide the net around the bale, and then to retract the duckbill from the insert position back to the home position once the bale is wrapped. In certain circumstances, the duckbill is unable to operate properly.

What is needed in the art is a baler that can address at least some of the previously described issues with known balers.

SUMMARY OF THE INVENTION

Exemplary embodiments disclosed herein provide a wrapping assembly with a variable brake that is controlled to reduce a braking force applied to a material roll when a load on a duckbill actuator exceeds a threshold value.

In some exemplary embodiments provided according to the present disclosure, a wrapping assembly for an agricultural baler includes: a material roll configured to hold a roll of wrapping material; a duckbill assembly including a duckbill carrying at least one duckbill roll and configured to draw material from a roll of wrapping material held by the material roll, the duckbill being movable between a first position and a second position; a duckbill actuator coupled to the duckbill and configured to move the duckbill between the first position and the second position; a variable brake associated with the material roll and configured to apply a variable braking force to the material roll; and a controller operatively coupled to the duckbill actuator and the brake. The controller is configured to: determine that a load on the duckbill actuator exceeds a threshold value; and output a brake reduction signal to the brake so the brake reduces applied braking force to the material roll when the load on the duckbill actuator exceeds the threshold value.

In some exemplary embodiments provided according to the present disclosure, an agricultural baler includes a chassis; a baling chamber carried by the chassis; and a wrapping assembly carried by the chassis. The wrapping assembly includes: a material roll configured to hold a roll of wrapping material; a duckbill assembly including a duckbill carrying at least one duckbill roll and configured to draw material from a roll of wrapping material held by the material roll, the duckbill being movable between a first position and a second position; a duckbill actuator coupled to the duckbill and configured to move the duckbill between the first position and the second position; a variable brake associated with the material roll and configured to apply a variable braking force to the material roll; and a controller operatively coupled to the duckbill actuator and the brake. The controller is configured to: determine that a load on the duckbill actuator exceeds a threshold value; and output a brake reduction signal to the brake so the brake reduces applied braking force to the material roll when the load on the duckbill actuator exceeds the threshold value.

In some exemplary embodiments provided according to the present disclosure, a method of controlling a wrapping assembly of an agricultural baler is provided. The wrapping assembly includes a material roll holding a roll of wrapping material, a duckbill comprising a movable duckbill carrying at least one duckbill roll and configured to draw wrapping material from the roll of wrapping material, a duckbill actuator coupled to the duckbill, and a variable brake coupled to the material roll. The method is performed by a controller and includes: outputting a movement signal to the duckbill actuator to move the duckbill from a first position to a second position; determining a load on the duckbill actuator exceeds a threshold value; and outputting a brake reduction signal to the brake so the brake reduces an applied braking force on the material roll after determining the load on the duckbill actuator exceeds the threshold value.

One possible advantage that may be realized by exemplary embodiments disclosed herein is that the controller can cause the brake to reduce the applied braking force to the material roll so the duckbill actuator is not overloaded trying to move the duckbill between different positions.

Another possible advantage that may be realized by exemplary embodiments disclosed herein is that the load on the duckbill actuator can be determined based on electric current drawn by the duckbill actuator, allowing the controller to also prevent the duckbill from drawing excessive electrical power.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Agricultural balers, such as round balers, are well known in the agricultural industry, and the instant invention can be used with substantially any of such machines. Reference is made, for example, to U.S. Pat. Nos. 6,877,304; 6,688,092; 6,644,006; and 6,295,797 that illustrate such balers, the disclosures of which are incorporated herein by reference in their entirety. For illustrative purposes, details of an exemplary round baler in which the features of the present invention may be used are disclosed in and will be described here in part with reference to U.S. Pat. No. 5,581,976, which is also hereby incorporated by reference in its entirety.

Figure 1:
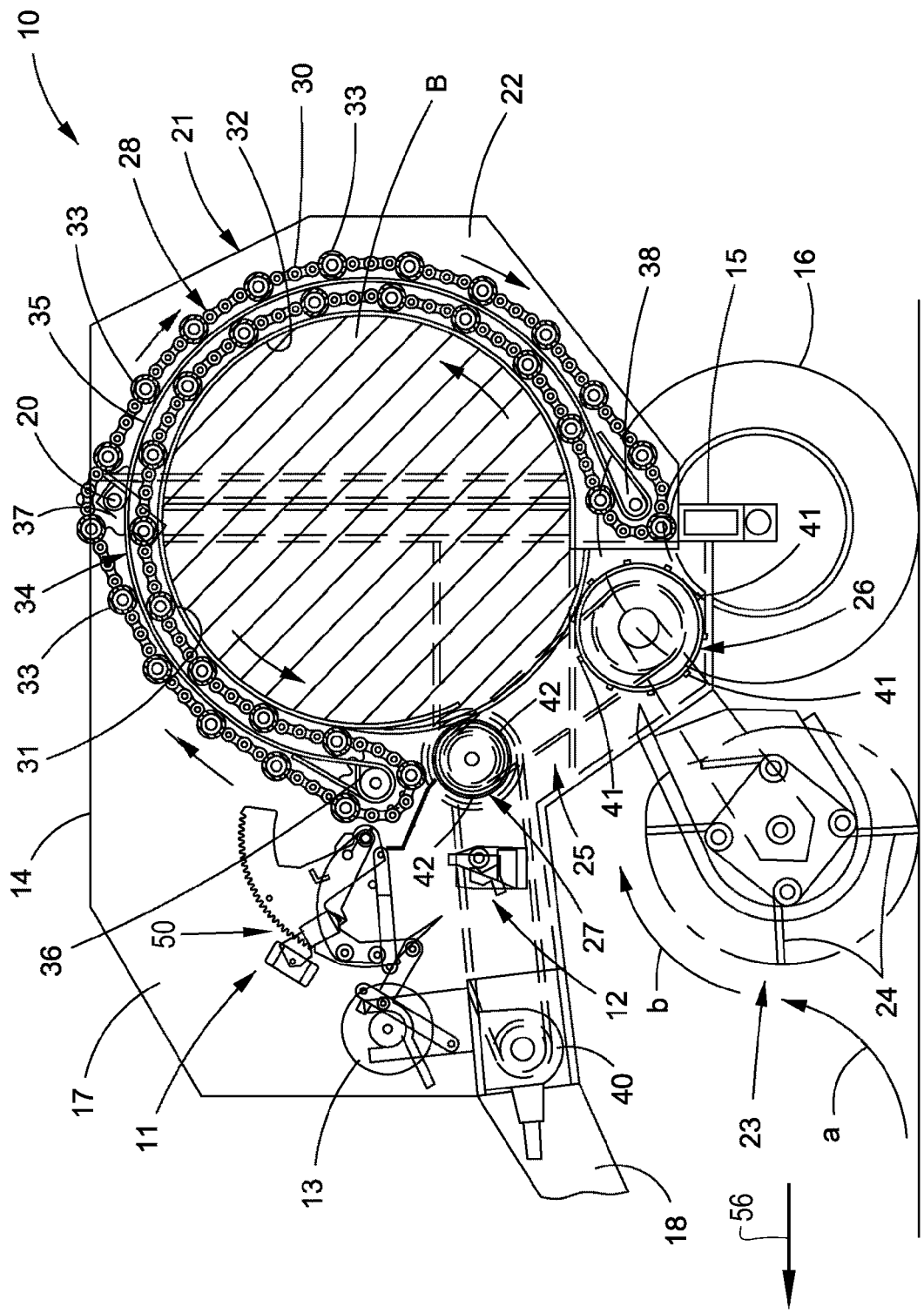
FIG. 1 illustrates a sectional view of an exemplary embodiment of an agricultural baler including a wrapping assembly, provided in accordance with the present disclosure.

FIG. 1 depicts an exemplary agricultural round baler, generally designated 10, in which embodiments of the present invention may be employed. As previously noted, crop in the field is usually arranged in a windrow as it is engaged by the baler 10 being pulled along the windrow of cut crop material by a tractor (not shown).

FIG. 1 illustrates a fixed chamber round baler 10 having a wrapping system for wrapping a cylindrical package of crop material (not shown) formed in a round baler 10. More particularly, the wrapping system of baler 10 comprises a wrapping assembly 11 and a cutting assembly 12 for cutting wrapping material, such as net, issued from a material roll 13.

As shown, round baler 10 includes a chassis 14 with a main support beam 15 on which a pair of wheels 16 (only one shown) are rotatably affixed. The chassis carries a cylindrical baling chamber including sidewalls 17. For the purposes of clarity only one wall 17 is shown in FIG. 1 and the elements mounted inwardly thereof are shown in full lines for clarity. For illustrative purposes reference letter B is used to designate a bale, shown in cross section in the chamber.

Baler 10 also includes a tongue 18 extending from the forward portion of chassis 14 for conventional connection to a tractor (not shown). Pivotally connected to the sidewalls of chassis 14 by a pair of stub shafts 20 is tailgate 21 which may be closed, as shown throughout the drawings, during bale formation or pivoted open about stub shafts 20 to discharge a completed bale. The tailgate includes tailgate walls 22 coextensive with side walls 17. A pickup assembly 23 mounted on chassis 14 in a suitable manner includes a plurality of fingers or tines 24 movable in a predetermined path to lift crop material from the ground, generally depicted by direction arrow a, and deliver it rearwardly (arrow b) toward a transverse inlet 25 in the chamber defined by a floor roll 26 and a transverse stripper roll 27, both of which rolls are rotatably supported on chassis 14 between sidewalls 17.

As shown, the baling chamber is defined primarily by an apron assembly 28 comprising a pair of support chains 30 mounted to travel along a continuous path, the inner run of which is defined on sidewalls 17 and tailgate walls 22 by front and rear sections 31, 32 of a continuous chain guide track that separates at a point of track adjacent the stub shaft 20 during bale discharge. The apron further comprises a plurality of parallel tubular crop engaging slats 33 extending between chains 30 to provide a cage-like periphery of the cylindrically shaped chamber. Radially outward of the inner run of apron assembly 28 are front and rear sections 34, 35 of continuous cylindrical bale chamber wall. These sections, also separable during bale discharge, are mounted between side walls 17 and tailgate walls 22, respectively, for maintaining integrity between the outer and inner runs of chain 30. Operatively engaged with chain 30 are drive sprocket 36 mounted between sidewalls 17, idler sprockets 37 also mounted between sidewalls 17 on shaft 20, and idler sprocket 38 mounted between tailgate walls 22. A conventional chain drive system for drive sprocket 36 is provided via appropriate coupling to gearbox 40 in a conventional manner, diagrammatically depicted in phantom outline outwardly of sidewall 17. The baling chamber is further defined by the outer conveying surfaces of floor roll 26 and stripper roll 27, both of which are driven in a direction opposite that of the bale chamber direction by conventional drive means appropriately coupled to gear box 40. In FIG. 1, floor roll 26 receives bale material at its forward surface, moving the bale material upward and rearward, clockwise as shown in FIG. 1. Bale material leaves the floor roll 26 and enters the baling chamber which rotates moving the bale material from a lower position, rearward and upward in a circular motion, counterclockwise as shown in FIG. 1. These rolls 26, 27 may be provided with ribs 41, 42 to enhance their ability to convey crops in the chamber as a bale is being formed. Other forms of aggressive surface structure may be used to accommodate various types of crops and conditions.

Figure 2:
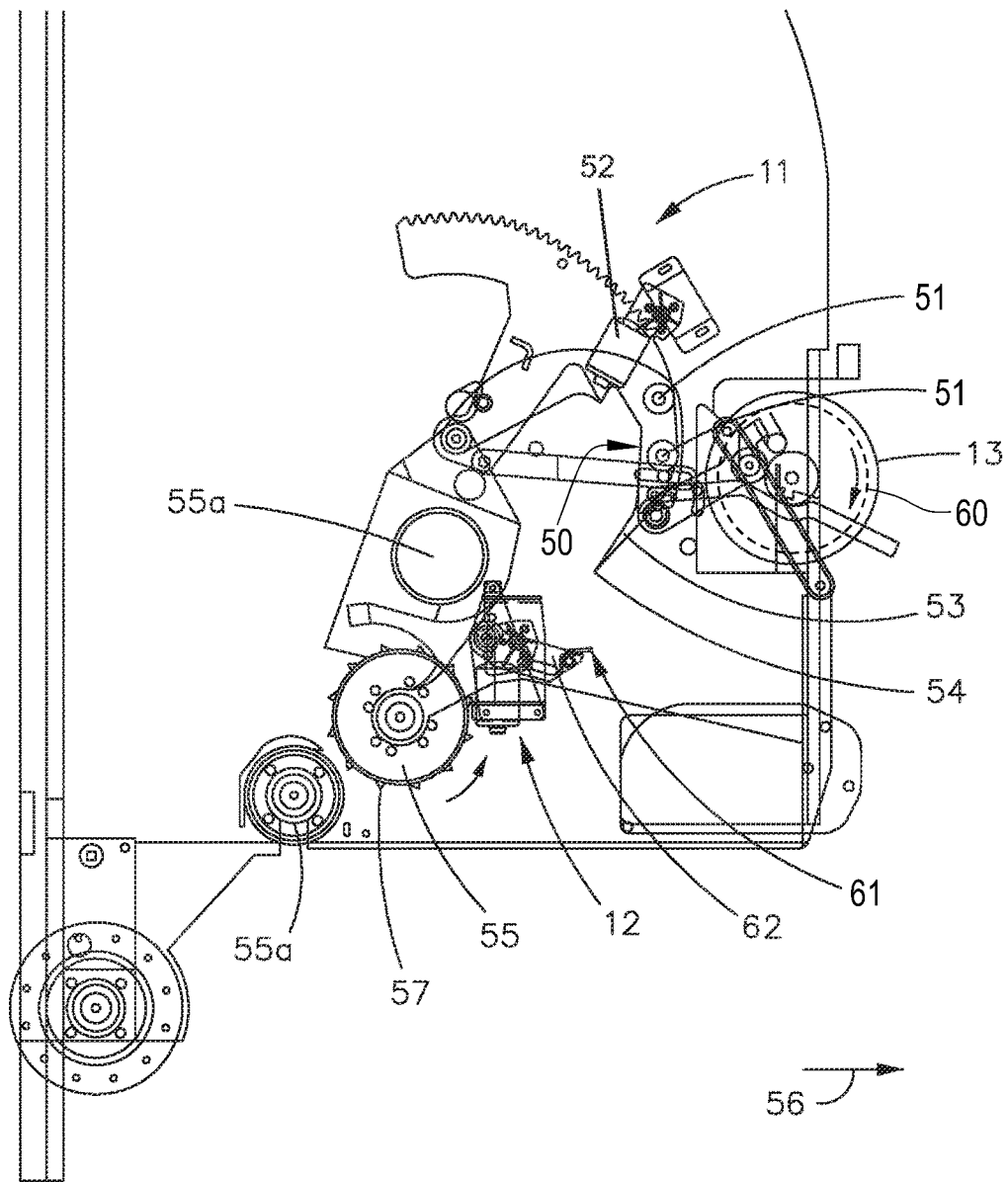
FIG. 2 illustrates a side view of an exemplary embodiment of a wrapping assembly with a duckbill in a home position.
Figure 3:
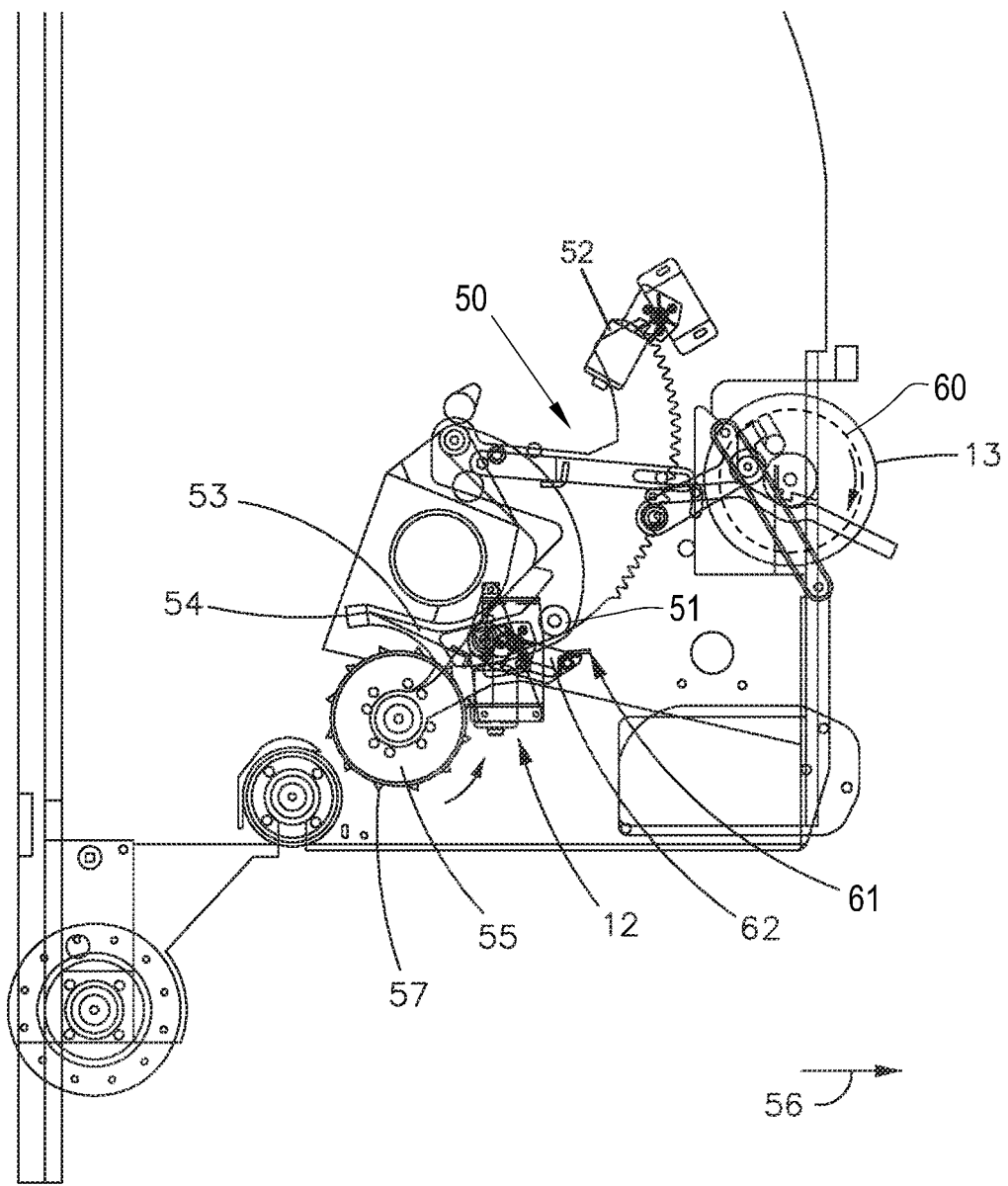
FIG. 3 illustrates a cross-sectional view of the wrapping assembly of FIG. 2 with the duckbill in an insert position.
Figure 4:
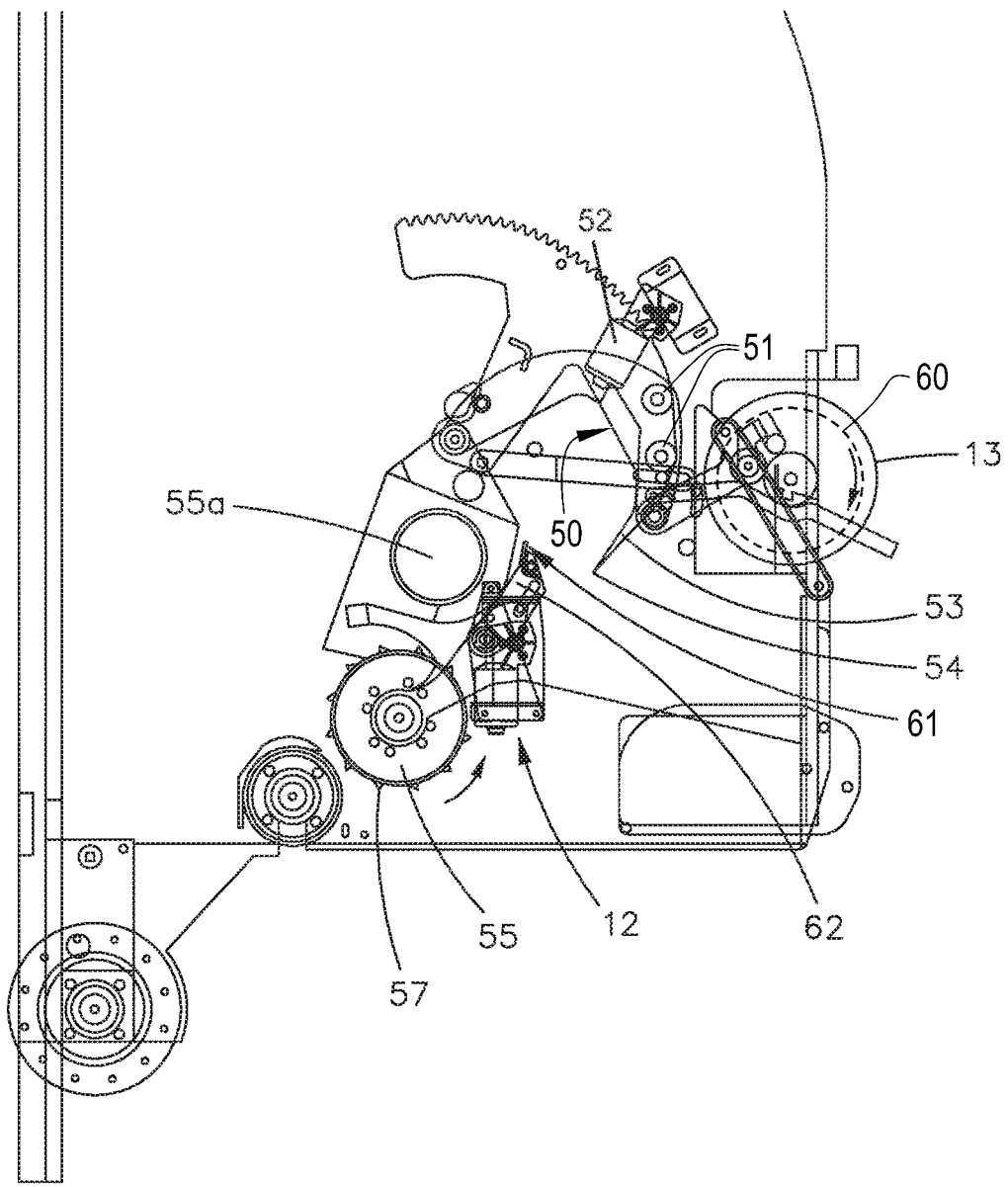
FIG. 4 illustrates a side view of the wrapping assembly of FIGS. 2-3 with a knife assembly in a cut position.

FIGS. 2-4 show an exemplary embodiment of the bale wrapping system comprising wrapping assembly 11 and net cutting assembly 12. As shown, the wrapping assembly 11 includes a material roll 13, a duckbill assembly 50 including at least one duckbill roll, illustrated as multiple duckbill rolls 51, carried by a duckbill 53, and a duckbill actuator 52 coupled to the duckbill 53. Bale chamber rolls 55 facilitate the forming of the bale and wrapping of the bale with the net. (Reference numeral 55a is used to denote the location of the axis of a bale chamber roll, which is not shown, for clarity.) The net cutting assembly 12 may include a knife 61 and a knife duckbill 62.

The wrapping assembly 11, including the duckbill assembly 50 and its associated structure and mechanisms may be conventional and common to the structure and operation described in the baler patents referenced and incorporated herein by reference above.

As shown, the wrapping material, such as net, may be fed from the material roll 13 and travel over the duckbill rolls 51 and exit a tip 54 of the duckbill 53. The tip 54 of the duckbill 53 serves to pinch the net and prevent the net from snapping back through the duckbill 53 once it is cut. Typically, a portion of net will extend out of the tip after a net cutting action. For example, it is common for a section of net that hangs out of the tip of the duckbill and that net tail is where it grabs on to the bale when the duckbill 53 is inserted for the next net wrapping cycle.

As shown, the duckbill actuator 52 may be dedicated to the duckbill 53, and operation of the duckbill actuator 52 functions to insert the duckbill 53 to commence a net wrapping cycle and then to retract the duckbill 53 at the end of the wrapping cycle once the net has been cut. The duckbill actuator 52 is thus configured to move the duckbill 53 between a first position, which may be an insert position, and a second position, which may be a home position, during retraction of the duckbill 53. The duckbill actuator 52 may be, for example, a motor that is powered by electricity, hydraulics, and/or pneumatics, as is known. The duckbill rolls 51 function to define the path of the net as it weaves through the duckbill assembly 50 and to ensure the net is stretched to one side of the bale to the other side of the bale. In the operation of the illustrated wrapping assembly 11, the net comes off the bottom of the material roll 13, which, in the figure, rotates clockwise, and goes around the upper side of the upper duckbill roll 51 and then makes essentially an 180-degree turn and then goes on the material roll side of the lower duckbill roll 51 and then through the tip 54 of the duck bill 53. A variable brake 60 is associated with the material roll 13 and is configured to apply a variable braking force to the material roll 13 to reduce or prevent rotation of the material roll 13, as will be described further herein. The rotational direction of the material roll 13 is unimportant, but ultimately determines the location where the net leaves the roll, and/or the number and placement of additional rolls needed to direct the net appropriately to the duckbill, and eventually rearward, toward the baling chamber. The front of the baler is indicated by arrow 56.

The bale chamber roll 55 closest to the up-cut net knife assembly 12 may include ribs 57 disposed about the outside of the roll. A bale chamber roller 55 positioned above this roller (not shown) may also include ribs. A gap or clearance may be formed between these two bale chamber rollers 55 to allow access for the tip 54 of the duckbill 53. As the bale chamber roll 55 rotates, the net pinches between the rolls and the bale and ribs 57 help grabs the net and feed it into the bale chamber and onto the bale. In the illustrated embodiment, the bale may rotate such that the top material moves forward and downward, with respect to the baler, clockwise as shown in the figure, in the chamber and the bale chamber rolls 55 rotate in the opposite direction, here counterclockwise.

FIG. 2 illustrates the wrapping assembly 11 and the knife assembly 12 in the home position. FIG. 3 illustrates the duckbill 53 in the insert position. FIG. 4 illustrates the wrapping assembly 11 again in the home position with the knife assembly 12 in the cut position.

During a net wrapping cycle, the wrapping assembly 11 moves through two positions: the home position to the insert position and back to the home position. In the home position (FIG. 2), the duckbill 53 of the wrapping assembly 11 is in the raised or home position. The home position is typically employed at the time a bale is being formed. At some point in time, the bale forming operation is completed and the time to wrap the bale occurs. At this time, the duckbill 53 of the wrapping assembly 11 is lowered to the insert position (FIG. 3), where the duckbill 53 rotates into the baling chamber. The duckbill tip 54 fits in between upper and lower bale chamber rolls 55 (the upper roll is not shown for clarity, but its location is marked 55*a*), and the net is pinched between the bale and the lower roll causing the net to start to feed on to the bale. Sensors (not shown) may be provided to determine when the net is flowing on to the bale. Once it is determined that the net has started wrapping on the bale, the duckbill 53 is retracted out of the bale chamber and returns to the duckbill home position (FIG. 4). Completion of the net wrapping may be determined using sensors and/or via passage of a specified time period. At this point in the net wrapping cycle, the net is still flowing out of the duckbill 53 to the bale chamber. It is also time to cut the net, the operation of which is performed by the knife assembly 12.

In known balers, the material roll may be provided with one or more brakes that provide resistance to rotation of the material roll. This resistance acts to maintain or increase tension in the wrapping material, especially when the bale chamber rolls pinch the material and draw it toward the baling chamber. While the increased tension in the wrapping material is beneficial to keep the wrapping material fully spread, there are drawbacks to excessive tension. In some instances, the tension in the wrapping material becomes so great that the duckbill actuator is unable to properly move the duckbill between the home position and the insert position, e.g., the duckbill actuator may stall and/or move the duckbill slowly when retracting the duckbill, which can disrupt the wrapping sequence. Further, excessive tension can cause the duckbill actuator to draw more current than normal and increase the power demands on the electrical system, which in many balers normally operates at or near capacity and does not have excess power to spare.

Figure 5:
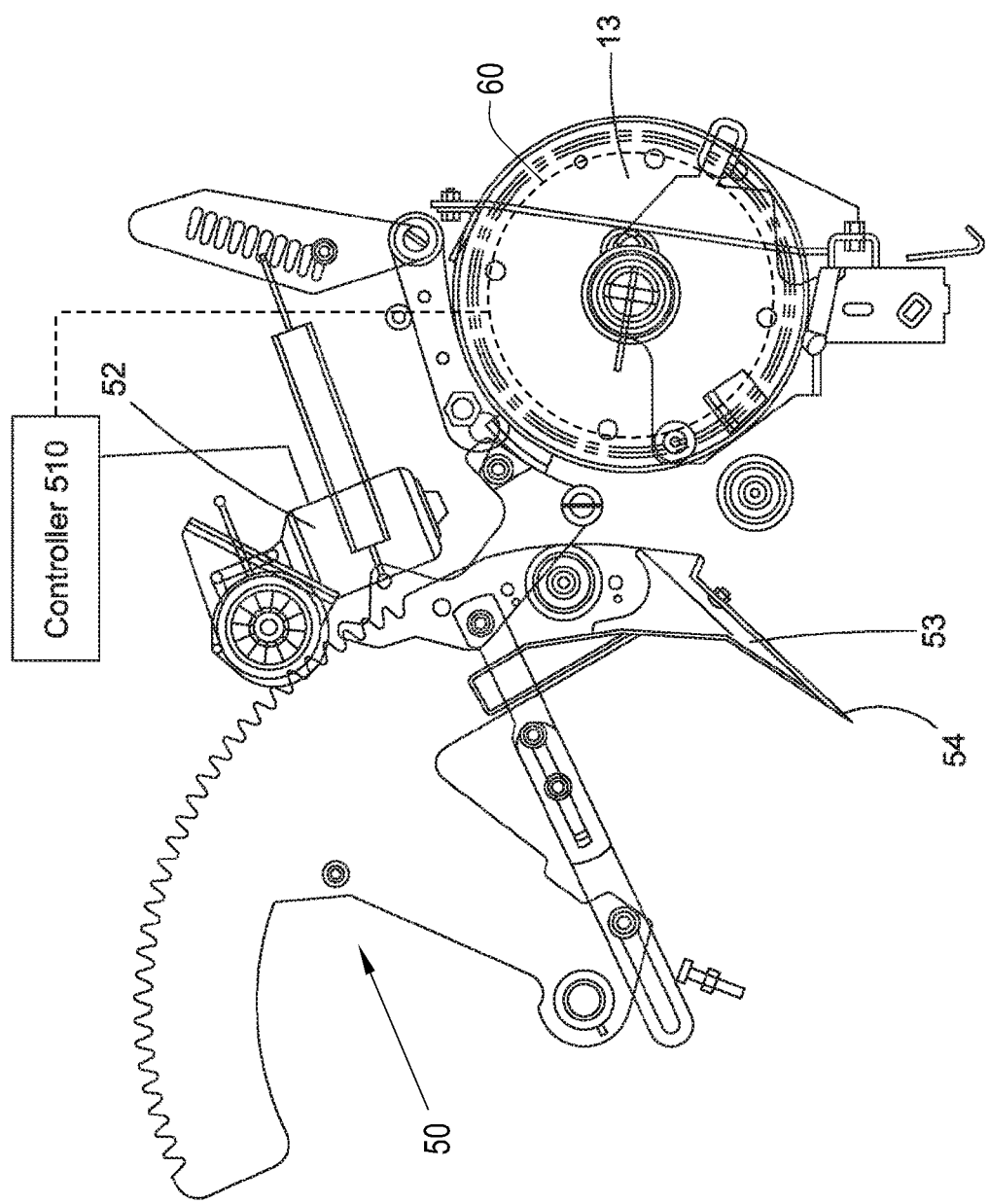
FIG. 5 illustrates a side view of the wrapper system of FIGS. 2-4 with the duckbill in the home position.
Figure 6:
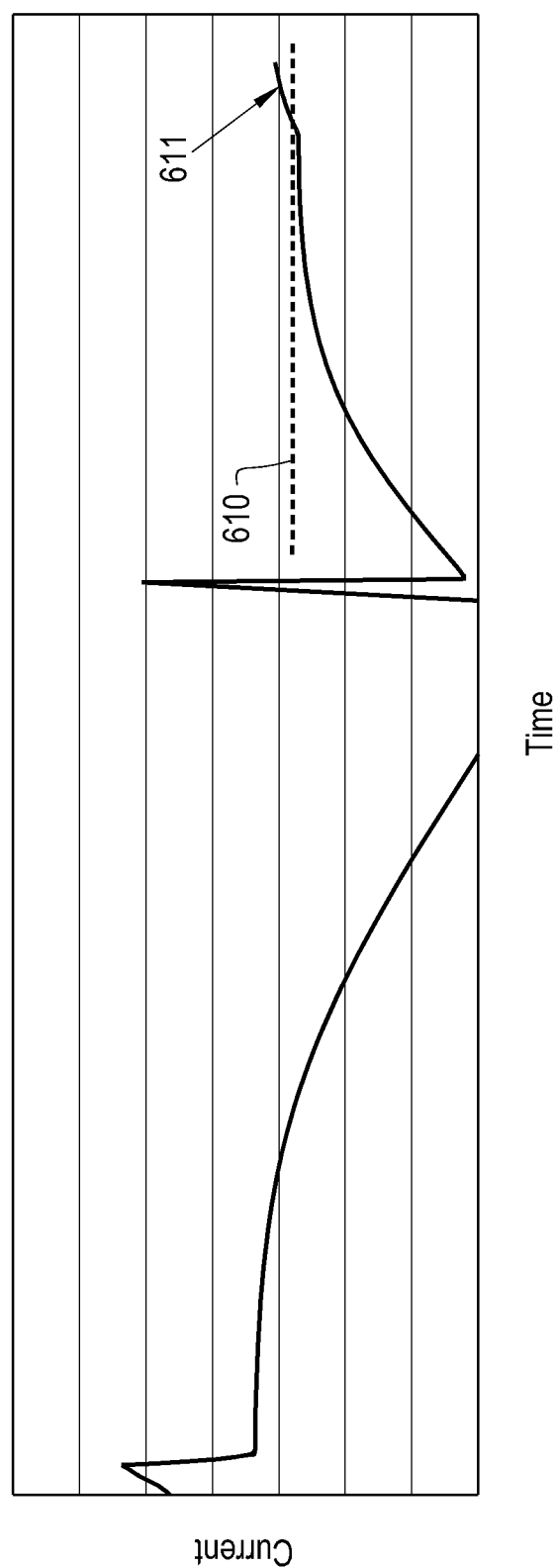
FIG. 6 is a graphical representation of an exemplary time-current plot of a duckbill actuator coupled to the duckbill during operation.

To address some of the previously described issues, and referring now to FIGS. 5-6, the wrapping assembly 11 includes a controller 510 that is operatively coupled to the duckbill actuator 52 and the brake 60. The controller 510 is configured to determine that a load on the duckbill actuator 52, which may be representative of tension in the wrapping material being drawn by the duckbill 53, exceeds a threshold value. When the controller 510 determines the load on the duckbill actuator 52 exceeds the threshold value, the controller 510 is configured to output a brake reduction signal to the brake 60 so the brake 60 reduces applied braking force to the material roll 11. In this respect, the controller 510 monitors the load on the duckbill actuator 52, which corresponds to how much power the duckbill actuator 52 needs to move the duckbill 53, and signals for the brake 60 to reduce the applied force on the material roll 11 when the load is above the threshold. Reducing the applied force on the material roll 11 can reduce the load on the duckbill actuator 52 by reducing the amount of tension in the wrapping material because there is less resistance to the wrapping material rotating off the material roll 11. Thus, the controller 510 can signal for the brake 60 to sacrifice tension in the drawn wrapping material and reduce the risk of the duckbill actuator 52 from stalling and being unable to properly operate during a wrapping cycle.

In some embodiments, the controller 510 is configured to determine the load on the duckbill actuator 52 by determining a current drawn by the duckbill actuator 52 exceeds a threshold current value. Since the duckbill actuator 52 tends to draw more current when more power is required to move the duckbill 53, a higher current drawn by the duckbill actuator 52 tends to correspond to a higher load on the duckbill actuator 52. The controller 510 may be, for example, a system controller that operates many different functions of the baler 10 and monitors/delivers power to the various components, such as the duckbill actuator 52. Thus, the controller 510 can determine the current drawn by the duckbill actuator 52, as is known, to monitor the load on the duckbill actuator 52.

An exemplary current-time plot is illustrated in FIG. 6. As illustrated in FIG. 6, the controller 510 may be configured to output the brake reduction signal when the current drawn by the duckbill actuator 52 goes above a threshold current value 610, which is illustrated in region 611 of FIG. 6. The drawn current demonstrated by region 611 may be experienced, for example, during retraction of the duckbill 53 from the insert position to the home position. To avoid unnecessarily reducing the braking force in response to momentary current spikes, the controller 510 may be configured to output the brake reduction signal only if the load on the duckbill actuator 52 exceeds the threshold value for a predetermined time value, such as at least 50 milliseconds. In some embodiments, the controller 510 is configured to determine the load on the duckbill actuator 52 during retraction of the duckbill 53 from the insert position to the home position to determine whether a brake reduction signal should be output. The controller 510 may be configured to output a brake reduction signal to the brake 60 that reduces the applied braking force in proportion to the amount that the load exceeds the threshold value. For example, the controller 510 may be configured to output a brake reduction signal that causes the brake 60 to reduce the applied braking force by a greater amount when the controller 510 determines that a greater current is drawn by the duckbill actuator 52 over the threshold current value compared to a smaller amount over the threshold current value.

In some embodiments, the controller 510 is configured to set the threshold current value based at least partially on an amount of current available for utilization by the duckbill actuator 52. For example, when the controller 510 is a system controller, the controller 510 can compare the amount of system electrical power that is currently being consumed to the maximum available power to determine how much current is available for utilization by the duckbill actuator 52. In some embodiments, the controller 510 is configured to assign a preset percentage of available electrical power to the duckbill actuator 52; in such embodiments, the amount of current available for utilization by the duckbill actuator 52 increases when overall system power consumption decreases, and vice versa. Setting the threshold current value based at least partially on the amount of current available for utilization by the duckbill actuator 52 can reduce the risk of the duckbill actuator 52 stalling by reducing the tension in the wrapping material when there is less electrical power available to power the duckbill actuator 52, such as when the electrical system of the baler 10 is heavily loaded.

After the controller 510 outputs the brake reduction signal to the brake 60, the load on the duckbill actuator 52 should reduce during normal operation. However, it is not beneficial, and actually may be harmful, if the reduction in the load is so great that the tension in the wrapping material is insufficient to keep the wrapping material spread. Similarly, it may be harmful if the brake reduction signal does not reduce the load on the duckbill actuator 52 by a sufficient amount and the duckbill actuator 52 remains overloaded following the initial reduction. In this regard, the controller 510 may be configured to determine if the output brake reduction signal lowers the load on the duckbill actuator 52 to be below the threshold value. If the load on the duckbill actuator 52 remains above the threshold value after outputting the brake reduction signal, the controller 510 can output an additional brake reduction signal to the brake 60 that causes a further reduction in the applied braking force. The controller 510 may be configured to repeat this sequence of determining the load on the duckbill actuator 52 remains above the threshold value and outputting brake reduction signals to the brake 60 until the load on the duckbill actuator 52 drops below the threshold value. This allows the controller 510 to signal for an incremental reduction in the braking force applied by the brake 60 to reduce the tension in the wrapping material while reducing the risk of the tension in the wrapping material being excessively reduced.

Figure 7:
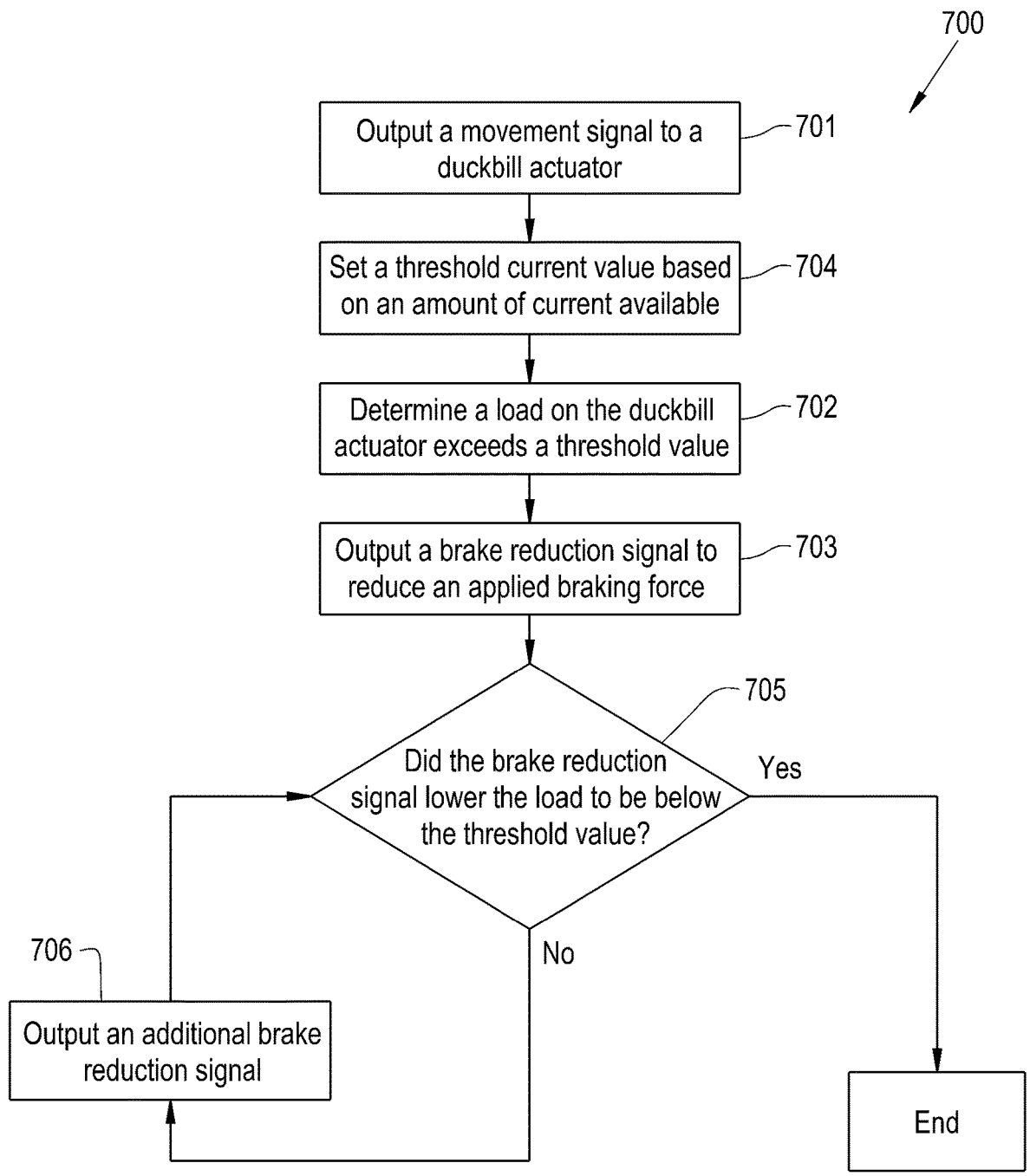
FIG. 7 illustrates a flowchart of an exemplary embodiment of a method for controlling a wrapping assembly, provided in accordance with the present disclosure.

Referring now to FIG. 7, an exemplary embodiment of a method 700 of controlling a wrapping assembly, such as the previously described wrapping assembly 11, of an agricultural baler 10 provided according to the present disclosure is illustrated. The wrapping assembly 11 includes a material roll 13 holding a roll of wrapping material, a duckbill assembly 50 including a movable duckbill 53 carrying at least one duckbill roll 51 and configured to draw wrapping material from the roll of wrapping material, a duckbill actuator 52 coupled to the duckbill 53, and a variable brake 60 coupled to the material roll 13. The method 700 is performed by a controller 510 and includes outputting 701 a movement signal to the duckbill actuator 52 to move the duckbill 53 from a first position to a second position. In some embodiments, outputting 701 the movement signal causes retraction of the duckbill 53 from an insert position to a home position. The method 700 further includes determining 702 a load on the duckbill actuator 52 exceeds a threshold value and outputting 703 a brake reduction signal to the brake 60 so the brake 60 reduces an applied braking force on the material roll 13 after determining the load on the duckbill actuator 52 exceeds the threshold value. In some embodiments, determining 702 the load on the duckbill actuator 52 includes determining an amount of current drawn by the duckbill actuator 52 exceeds a threshold current value, as previously described. In some embodiments, the brake reduction signal is only output 703 if the load on the duckbill actuator 52 exceeds the threshold value for a predetermined time value, as previously described.

In some embodiments, the method 700 includes setting 704 the threshold current value based at least partially on an amount of current available for utilization by the duckbill actuator 52. Setting 704 the threshold current value is previously described in the context of the function of the controller 510, so further description is omitted for brevity. Alternatively or in addition, the threshold current value can be manually set 704 by an operator.

After outputting 703 the brake reduction signal, it can be determined 705 if the output brake reduction signal lowered the load on the duckbill actuator 52 to be below the threshold value. If the output brake reduction signal did not lower the load on the duckbill actuator 52 to be below the threshold value, an additional brake reduction signal can be output 706. This sequence of determining 705 and outputting 706 can be repeated until it is determined that the load on the duckbill actuator 52 is below the threshold value, i.e., this sequence can act as a feedback loop to incrementally lower the applied braking force and load on the duckbill actuator 52 until the load on the duckbill actuator 52 is below the threshold value.

It is to be understood that the steps of the method 700 are performed by the controller 510 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 510 described herein, such as the method 700, is implemented in software code or instructions which are tangibly stored on a tangible computer readable medium. The controller 510 loads the software code or instructions via a direct interface with the computer readable medium or via a wired and/or wireless network. Upon loading and executing such software code or instructions by the controller 510, the controller 510 may perform any of the functionality of the controller 510 described herein, including any steps of the method 700 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A wrapping assembly for an agricultural baler, comprising:
    a material roll configured to hold a roll of wrapping material;
    a duckbill assembly comprising a duckbill carrying at least one duckbill roll and configured to draw material from a roll of wrapping material held by the material roll, the duckbill being movable between a first position and a second position;
    a duckbill actuator coupled to the duckbill and configured to move the duckbill between the first position and the second position;
    a variable brake associated with the material roll and configured to apply a variable braking force to the material roll; and
    a controller operatively coupled to the duckbill actuator and the brake, the controller being configured to:
        determine a maximum amount of current available for utilization by the duckbill actuator;
        determine that a load on the duckbill actuator exceeds a threshold value, wherein the controller is configured to determine the load on the duckbill actuator exceeds the threshold value by determining that a current drawn by the duckbill actuator exceeds a threshold current value, wherein the controller is configured to set the threshold current value based at least partially on the maximum amount of current available for utilization by the duckbill actuator; and
        output a brake reduction signal to the brake so the brake reduces applied braking force to the material roll when the load on the duckbill actuator exceeds the threshold value.

2. The wrapping assembly of claim 1, wherein the brake is an electric brake.

3. The wrapping assembly of claim 1, wherein the first position is an insert position and the second position is a home position and the controller is configured to determine the load on the duckbill actuator as the duckbill actuator moves the duckbill between the insert position and the home position.

4. The wrapping assembly of claim 1, wherein the controller is further configured to determine if the output brake reduction signal lowers the load on the duckbill actuator to be below the threshold value and output an additional brake reduction signal if the load on the duckbill actuator remains above the threshold value after outputting the brake reduction signal.

5. The wrapping assembly of claim 1, wherein the controller is configured to output the brake reduction signal only if the load on the duckbill actuator exceeds the threshold value for a predetermined time value.

6. The wrapping assembly of claim 5, wherein the predetermined time value is at least 50 milliseconds.

7. The wrapping assembly of claim 1, wherein the controller is configured to determine the maximum amount of current available for utilization by the duckbill actuator by comparing an amount of system electrical power that is currently being consumed to a maximum available power.

8. An agricultural baler, comprising:
    a chassis;
    a baling chamber carried by the chassis; and
    a wrapping assembly carried by the chassis, the wrapping assembly comprising:
        a material roll configured to hold a roll of wrapping material;
        a duckbill assembly comprising a duckbill carrying at least one duckbill roll and configured to draw material from a roll of wrapping material held by the material roll, the duckbill being movable between a first position and a second position;
        a duckbill actuator coupled to the duckbill and configured to move the duckbill between the first position and the second position;
        a variable brake associated with the material roll and configured to apply a variable braking force to the material roll; and
        a controller operatively coupled to the duckbill actuator and the brake, the controller being configured to:
            determine a maximum amount of current available for utilization by the duckbill actuator;
            determine that a load on the duckbill actuator exceeds a threshold value, wherein the controller is configured to determine the load on the duckbill actuator exceeds the threshold value by determining that a current drawn by the duckbill actuator exceeds a threshold current value, wherein the controller is configured to set the threshold current value based at least partially on the maximum amount of current available for utilization by the duckbill actuator; and
            output a brake reduction signal to the brake so the brake reduces applied braking force to the material roll when the load on the duckbill actuator exceeds the threshold value.

9. The agricultural baler of claim 8, wherein the brake is an electric brake.

10. The agricultural baler of claim 8, wherein the first position is an insert position and the second position is a home position and the controller is configured to determine the load on the duckbill actuator as the duckbill actuator moves the duckbill between the insert position and the home position.

11. The agricultural baler of claim 8, wherein the controller is further configured to determine if the output brake reduction signal lowers the load on the duckbill actuator to be below the threshold value and output an additional brake reduction signal if the load on the duckbill actuator remains above the threshold value after outputting the brake reduction signal.

12. The agricultural baler of claim 8, wherein the controller is configured to output the brake reduction signal only if the load on the duckbill actuator exceeds the threshold value for a predetermined time value.

13. The agricultural baler of claim 12, wherein the predetermined time value is at least 50 milliseconds.

14. The agricultural baler of claim 8, wherein the controller is configured to determine the maximum amount of current available for utilization by the duckbill actuator by comparing an amount of system electrical power that is currently being consumed to a maximum available power.

15. A method of controlling a wrapping assembly of an agricultural baler, the wrapping assembly comprising a material roll holding a roll of wrapping material, a duckbill assembly comprising a movable duckbill carrying at least one duckbill roll and configured to draw wrapping material from the roll of wrapping material, a duckbill actuator coupled to the duckbill, and a variable brake coupled to the material roll, the method being performed by a controller and comprising:

outputting a movement signal to the duckbill actuator to move the duckbill from a first position to a second position;

determining a maximum amount of current available for utilization by the duckbill actuator;

setting a threshold current value based at least partially on the maximum amount of current available for utilization by the duckbill actuator;

determining a load on the duckbill actuator exceeds the threshold current value, wherein determining the load on the duckbill actuator exceeds the threshold current value comprises determining an amount of current drawn by the duckbill actuator exceeds the threshold current value; and outputting a brake reduction signal to the brake so the brake reduces an applied braking force on the material roll after determining the load on the duckbill actuator exceeds the threshold current value.

* * * * *